United States Patent

Green et al.

[11] Patent Number: 5,284,064
[45] Date of Patent: Feb. 8, 1994

[54] QUIET, SINGLE-CYCLE MECHANISM

[75] Inventors: Timothy A. Green, Lexington; David K. Klaffenbach, Versailles; Mohsen Marefat; Kevin D. Schoedinger, both of Lexington, all of Ky.

[73] Assignee: Lexmark International, Inc., Greenwich, Conn.

[21] Appl. No.: 987,840

[22] Filed: Dec. 9, 1992

[51] Int. Cl.$^5$ .............................................. F16H 27/08
[52] U.S. Cl. ........................................ 74/435; 74/113; 192/142 R
[58] Field of Search ............... 74/84 R, 112, 113, 435; 192/142 R

[56] References Cited

U.S. PATENT DOCUMENTS

| | | | |
|---|---|---|---|
| 2,536,909 | 1/1951 | Clyne | 74/435 |
| 2,917,939 | 12/1959 | Harris | 74/435 |
| 3,495,693 | 2/1970 | Limberger | 74/112 X |
| 4,003,267 | 1/1977 | Busch | 74/435 X |
| 4,310,087 | 1/1982 | Gawler | 192/142 R |
| 4,940,348 | 7/1990 | Akers et al. | 400/624 |
| 5,097,162 | 3/1992 | Wang | 310/49 R |

Primary Examiner—Allan D. Herrmann
Attorney, Agent, or Firm—John A. Brady

[57] ABSTRACT

A low-noise, paper pick or other single cycle mechanism is obtained by employing a rotary solenoid (15) which has a force to a detent position which may be overcome by force from a drive roller (1). In the detent position the drive roller faces a blank sector (5) of a gear (3) which is integral with a shaft (7), which is the shaft to be turned. An electrical control signal to the solenoid rotates gear (3) through gear (13), which is directly driven by the solenoid, and which turns gear (11) on the shaft. The drive gear overcomes the force of the solenoid until it is disengaged after one cycle, at which time the detent force of the solenoid holds the mechanism in its detent position.

4 Claims, 2 Drawing Sheets

QUIET, SINGLE-CYCLE MECHANISM

DESCRIPTION

1. Technical Field

This invention relates to mechanism to receive turning force from a power source and to transmit that force to a driven shaft for one cycle and selectably. A primary application for such mechanism is to turn a paper feed shaft carrying a friction roller which moves paper off the top of a stack of paper.

2. Background of the Invention

Conventional single-cycle mechanism have a standby position which is detented by one member physically abutting another member and which is detented again after one cycle by these two members being brought together. Such physical impact produces undesirable noise. When the detent is eliminated to start a cycle, this is typically done by a solenoid separating the abutting members, which is also noisy. U.S. Pat. No. 4,940,348 to Akers et al is illustrative of a mechanical system, although it is not directed to suppression of noise.

This invention employs magnetic detenting which eliminates such noise. A component of this invention is a device which may be rotated by electrical input, which has a detent position which is defined magnetically by the device and which may be overcome by predetermined force while the device remains capable of automatic detenting on relief of such force. Such a device is disclosed in U.S. Pat. No. 5,097,162 to Wang and is offered commercially by Philips Technologies of North American Philips Corp. under the commercial name "torquer."

DISCLOSURE OF THE INVENTION

In accordance with this invention, a driven gear has a blank sector, as is conventional for single-cycle mechanisms, but this sectored gear is integral with a rotary solenoid which has a magnetic or other detent position and which may be rotated a complete revolution. A drive gear meshes with the teeth or otherwise peripherally engages the driven gear except at the blank section, and the detent position positions the blank sector at the drive gear.

A single cycle is selected by pulsing the rotary solenoid to rotate sufficiently to move the blank sector past the driven gear. The driven gear then meshes with the drive gear, which continues to turn the driven gear. The detent force of the rotary solenoid is overcome by the higher force from the drive gear, and the rotary solenoid continues to move. At the end of one cycle the blank sector again faces the drive gear, which disconnects the drive gear from the driven gear. The detent force of the rotary solenoid then predominates, causing the solenoid to seek the detent position and hold the blank sector opposite the drive gear to thereby terminate a cycle. Another cycle is initiated by pulsing the rotary solenoid.

Since this operation employs no mechanical abutments or separating movements, it is very quiet.

BRIEF DESCRIPTION OF THE DRAWING

The details of this invention will be described in connection with the accompanying drawing, in which.

BEST MODE FOR CARRYING OUT THE INVENTION

Figure 1:
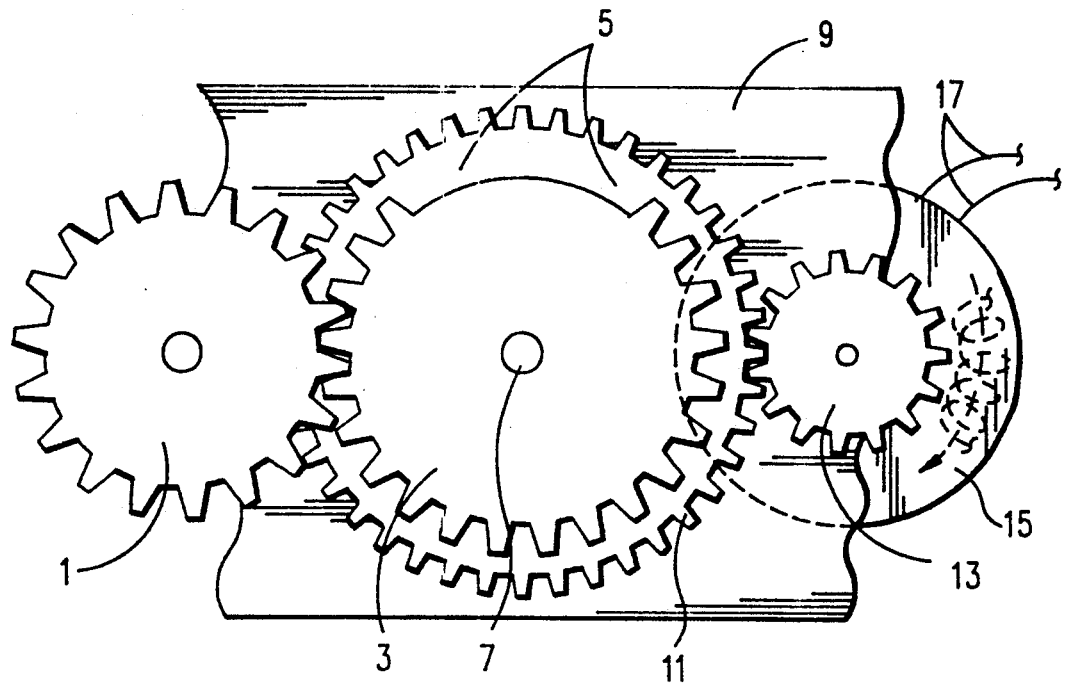
FIG. 1 is a front view of the preferred embodiment.

FIG. 1 illustrates a drive gear 1, which receives turning power from motor (not shown) or other conventional source. Gear 1 meshes with a driven gear 3, having a depressed or blank segment of teeth 5, at which gear 1 turns freely without meshing with gear 3. Gear 3 is integral with shaft 7 and is mounted to frame 9 by shaft 7. Integral with gear 3 and also shaft 7 is gear 11, which is larger than gear 3. Gear 11 is closer to frame 9 than gear 3, and meshes with gear 13 which is integral with rotary solenoid 15. Solenoid 15 has control electrical leads 17.

As discussed in the foregoing, solenoid 15 is a commercially available device promoted as a variable angle stepper motor, but having the characteristic of rotating gear 13 a limited amount in response to an electrical signal on lines 17, the characteristic of having a detent position to which it is moved with a significant force, and the characteristic of being rotatable a full turn by sufficient force on gear 13 without loss of the detent characteristic upon the end of such full turn by gear 13.

Figure 4:
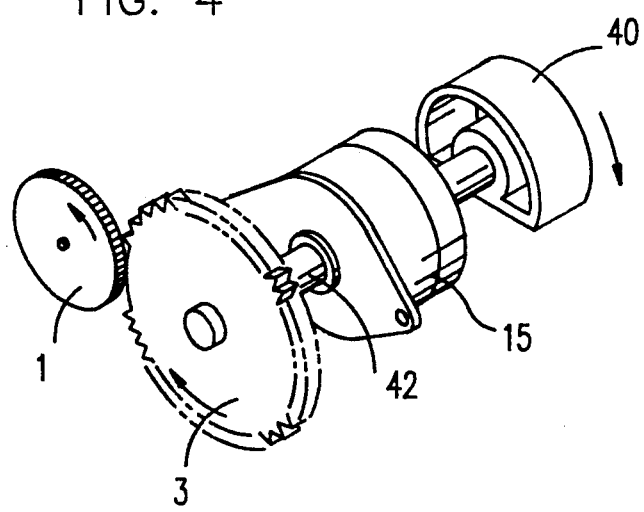
FIG. 4 is an orthogonal view of an alternative embodiment.
Figure 2:
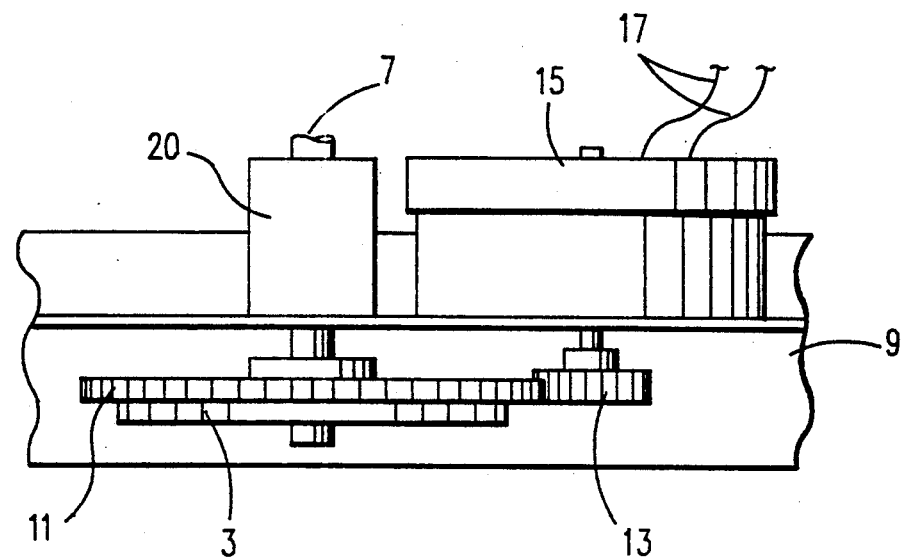
FIG. 2 is a top view of that embodiment, FIG. 3. is an orthogonal view of that embodiment.

FIG. 2 is a top view of this mechanism. Shaft 7 is shown to be supported on the side of frame 9 opposite gear 3 by a bushing 20, which may be of standard configuration. Shaft 7 is the driven shaft which is turned by one revolution by this preferred mechanism. Shaft 7 is shown broken off shortly past bushing 20, and in practice will extend as required to support whatever element it is to operate on. The primary implementation contemplated is one in which shaft 7 has mounted on it a D roller 40 as shown in the embodiment of FIG. 4. A D roller, which is believed to take its name from its external contour, is employed to move paper from a stack of papers by frictional contact with the surface of the D roller, which is conventional. Any mechanism operated by rotation may be mounted of shaft 7 consistent with this invention.

Figure 3:
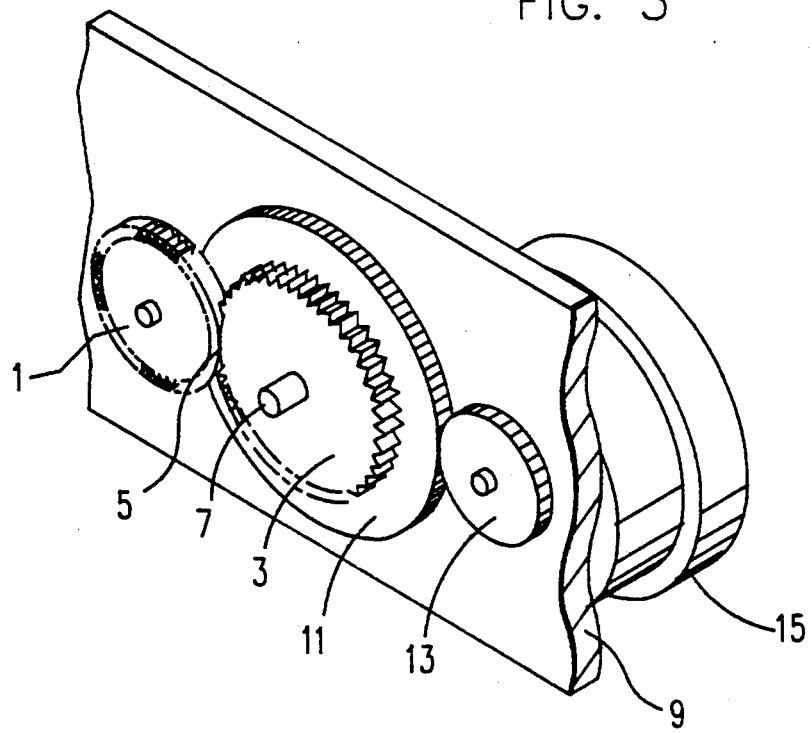

FIG. 3 shows the drive roller 1 facing blank segment 5, which is the detent position. Solenoid 15 moves gear 13 to a predetermined position unless the detent force of solenoid 15 is overcome by a greater force on gear 13. When segment 5 faces drive gear 1, drive gear 1 is disengaged from gear 3 and therefore no force is translated to gear 13. The detent force therefore predominates, and the mechanism moves to the detent position of FIG. 3.

In operation an electrical signal on lines 17 causes solenoid 15 to rotate to turn gear 11, which turns gear 3 a sufficient amount to move segment 5 past drive gear 1 and thereby cause the teeth of gear 1 to mesh with the teeth of gear 3. Drive gear 1 is continually driven during normal operation. Drive gear 1 is turned with sufficient force to overcome the detent force of solenoid 15, and therefore gear 3 continues to turn which turns shaft 7 and gear 11. The teeth of gear 11 mesh with the teeth of gear 13 to thereby turn gear 13, which is integral with the internal turning mechanism of solenoid 15. During this rotation, any element held on shaft 7 is rotated and may perform functions such as paper feed, the driving of a pump, or any other function operated by rotation.

At the end of one revolution of shaft 7, blank segment 5 again faces drive gear 1, which disengages drive gear 1 from gear 3. The detent force of solenoid 15 then controls and the mechanism is held in the detent position shown in FIG. 3.

The embodiment of FIG. 4 operates off of the shaft 42 which extends through and is an extension of the internal turning mechanism of solenoid 15, thus eliminating separate shaft 7 while requiring the necessary design of solenoid 15 to have a shaft 42 sufficient to support a D roller 42. This also eliminates the second gear 11. As with the first embodiment, operation is by pulsing solenoid 15 and terminates when drive gear 1 faces blank sector 5, thereby permitting the detent force of solenoid 15 to predominate. FIG. 4 shown the mechanism in the detent position.

The operation of these embodiments involves no mechanical impacts or scraping and is therefore very quiet.

Various other alternatives and modifications can be anticipated which are within the spirit and scope of this invention.

What is claimed is:

1. Single-cycle, driven-shaft selection apparatus comprising a drive gear, a driven shaft, a first gear axially mounted integral with said driven shaft, said drive gear having peripheral engaging means with said first gear except at a sector of said first gear, an angularly rotatable solenoid seeking a detent position which may be overcome by a predetermined force and permitting full circumferential rotation of said solenoid without impairing said operation of said solenoid, said driven shaft being operatively mounted for rotation by rotation of said first gear and being operatively mounted for rotation by rotation of said solenoid, the detent position of said solenoid being a location at which said drive gear faces said sector.

2. The single-cycle apparatus of claim 1 in which said driven shaft is operatively mounted for rotation with said solenoid by being connected by a second gear mounted on said shaft engaged with a gear mounted to be rotated by said solenoid.

3. The single-cycle apparatus of claim 1 in which said driven shaft is operatively mounted for rotation with said solenoid by being of an extension of the internal mechanism of said solenoid which is rotated by said solenoid.

4. Single-cycle, driven-shaft selection apparatus comprising a drive gear, a driven shaft, a first gear axially mounted integral with said driven shaft, a second gear axially mounted integral with said driven shaft, said drive gear having peripheral engaging means with said first gear except at a sector of said first gear, an angularly rotatable solenoid seeking a detent position which may be overcome by a predetermined force and permitting full circumferential rotation of said solenoid without impairing said operation of said solenoid, and a third gear integral with said solenoid to be rotated with said rotation of said solenoid, said second gear and said third gear having peripheral engaging means around their entire circumference positioned to locate said indented sector to disengage said first gear from said drive gear when said solenoid is at said detent position.

* * * * *